(12) United States Patent
Stenzel et al.

(10) Patent No.: US 9,366,003 B1
(45) Date of Patent: Jun. 14, 2016

(54) AUTOMATIC LIFT AND TOSS SHOVEL

(71) Applicants: Kent J. Stenzel, Larkspur, CO (US); Dale W. Cordell, Palmer Lake, CO (US)

(72) Inventors: Kent J. Stenzel, Larkspur, CO (US); Dale W. Cordell, Palmer Lake, CO (US)

( * ) Notice: Subject to any disclaimer, the term of this patent is extended or adjusted under 35 U.S.C. 154(b) by 0 days.

(21) Appl. No.: 14/701,498

(22) Filed: Apr. 30, 2015

(51) Int. Cl.
  *E01H 5/02* (2006.01)
  *E02F 3/02* (2006.01)
  *E01H 5/06* (2006.01)

(52) U.S. Cl.
  CPC .. *E02F 3/02* (2013.01); *E01H 5/02* (2013.01); *E01H 5/06* (2013.01)

(58) Field of Classification Search
  CPC ........... A01B 1/028; B62B 1/147; E02F 3/02; E01H 5/02; E01H 5/06
  USPC ............ 37/265, 285, 264; 294/54.5, 53.5, 57; 280/47.26, 651
  See application file for complete search history.

(56) References Cited

U.S. PATENT DOCUMENTS

| | | | | |
|---|---|---|---|---|
| 3,748,761 A * | 7/1973 | Chetwynde | ............... | E01H 5/02 280/47.26 |
| 4,130,953 A * | 12/1978 | Bruno | ...................... | E01H 5/02 280/47.26 |
| 4,302,894 A * | 12/1981 | Emma | ..................... | B62B 1/147 298/2 |
| 5,048,206 A * | 9/1991 | Jones | ...................... | B62B 1/147 280/651 |
| 6,663,085 B1 * | 12/2003 | Dalon | ..................... | B66F 15/00 254/131.5 |
| 7,100,313 B2 * | 9/2006 | Scherer | .................. | A01B 1/028 254/131.5 |
| 7,654,592 B2 * | 2/2010 | Stenzel | ..................... | E01H 5/02 294/54.5 |
| 7,681,932 B2 * | 3/2010 | Chang | ....................... | E01H 5/02 294/54.5 |
| 2006/0214443 A1 * | 9/2006 | Dixon | ...................... | E01H 5/02 294/54.5 |
| 2007/0113430 A1 * | 5/2007 | Chang | ....................... | E01H 5/02 37/265 |

* cited by examiner

*Primary Examiner* — Robert Pezzuto

(57) ABSTRACT

An automatic lift and toss shovel has a bucket, a lift and toss apparatus, a frame support and a maneuvering frame that together gather, push, lift and toss materials. The bucket utilizes sidewalls, a gathering member, and a lifting member to gather and contain materials therein and allow them to be pushed. A lift and toss apparatus attaches the bucket to the frame support. The apparatus utilizes a combination of swing, toss, lift, guide and cross arms/members to support and guide the bucket and provide for automatic lifting and tossing of the bucket contents as the shoveler desires. The frame support has wheels to assist the shoveler in gathering snow and relocating it. The maneuvering frame is attached to the frame support and provides the handles which allow the user to control and operate the lift and toss shovel.

25 Claims, 11 Drawing Sheets

AUTOMATIC LIFT AND TOSS SHOVEL

TECHNICAL FIELD

The present invention relates generally to the field of shovels; and, more particularly, to an automatic lift and toss shovel.

BACKGROUND

Shovels and other devices which help people to relocate materials such as dirt, sand, gravel, snow, etc. are some of the earliest tools made by humans. In recent times, motorized and powered equipment has supplanted much of the work previously done by hand. However, there remain many jobs for which hand-powered tools are adequate, and indeed, sometimes preferable. For example, when moving less-dense materials such as snow, a well-employed shovel can be more efficient and require less time than powered equipment such as a snow blower. This is especially true when shoveling hard-surfaces such as walks and driveways. However, the manual efforts required to utilize a standard snow shovel can be too much for some, as evidenced by the large number of emergency room visits and deaths associated with such activity. Hence, there is a need for a manual-type shovel that requires less effort and provides quicker results than a traditional shovel.

A number of prior art devices have been developed previously in order to attempt to address this need. For example, wheeled push-shovels are known in the art and can be used to push snow from an area. These push-shovels are somewhat efficacious when the snow depth is shallow and the perimeter of the area that needs to be cleaned is clear of snow piles from previous snowfalls. However, when the perimeter is already filled with piles of snow, attempting to simply push more snow to the perimeter is not workable and the intrepid snow-shoveler must resort to lifting the new snow and tossing it on top of the old piles—effectively nullifying the advantages that wheeled push-shovels offer over more traditional snow shovels.

One prior art device has attempted to address this issue by offering a lever that allows the snow-shoveler to lift and move the snow using mechanical advantage. U.S. Pat. No. 7,654,592 to Stenzel discloses a wheeled snow shovel having a vertical lift and dump mechanism integrated into the shovel. This device is quite useful, but is relatively complex, expensive, and requires extra motions and effort on the part of the person operating the shovel. For example, once the user has gathered snow in the bucket and pushed it to the edge of a driveway, he or she must then operate a lever to lift the bucket and dump the snow. This extra step takes time and effort which can impede the quick clearing of snow from an area.

What is needed is a snow shovel that allows a shoveler to quickly and easily clear an area of snow while also automatically lifting and tossing gathered snow up and over previously piled snow.

SUMMARY

One embodiment of an automatic lift and toss shovel comprises a bucket, a lift and toss apparatus, a frame support and a maneuvering frame that function in combination to meet the needs described above. The bucket utilizes a lifting member and a gathering member so snow (or other materials) can be gathered into the shovel and then lifted and tossed. The bucket utilizes sidewalls to contain the materials therein. Additionally, a plurality of bucket extensions can be attached to the sidewalls to extend the width of the bucket and allows the automatic lift and toss shovel to move more material more quickly. A lift and toss apparatus attaches the bucket to the frame support. The apparatus utilizes a combination of swing, toss, lift, guide and cross members to support the bucket and attach it to the frame support. The combination also provides for automatically lifting and tossing the bucket as the user requires. The frame support has one or more wheels attached thereto to assist the user in easily gathering snow in the bucket and relocating it to the perimeter of the area being cleared. The maneuvering frame is attached to the frame support and provides the handles which allow the user to control and operate the lift and toss shovel.

DETAILED DESCRIPTION

Figure 1:
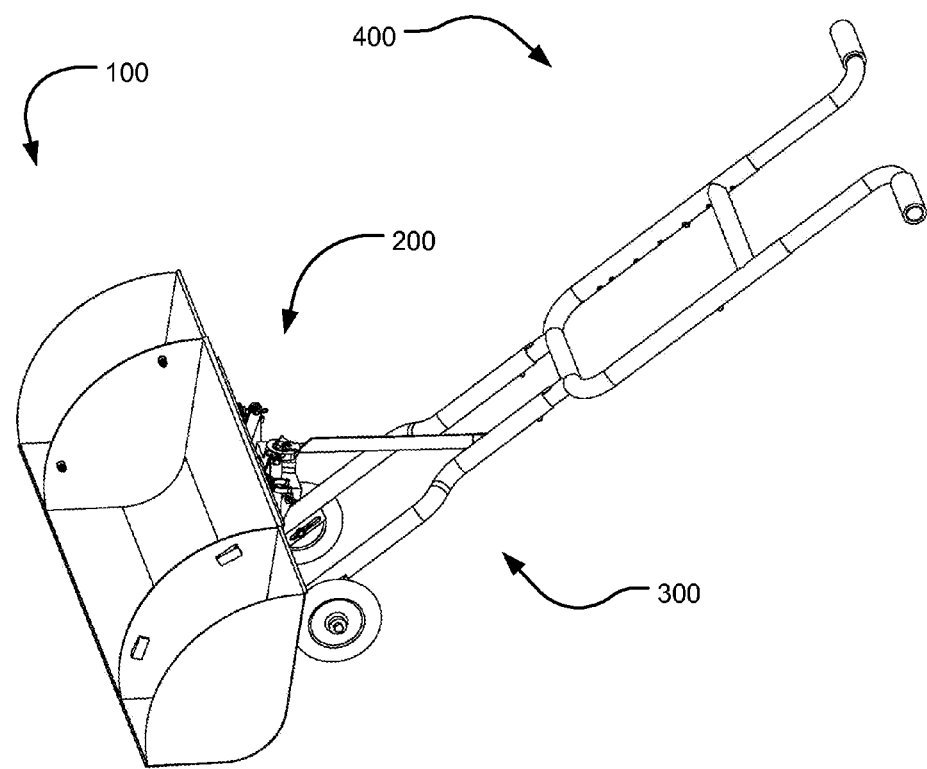
FIG. 1 illustrates a top and side perspective view of an exemplary embodiment of an automatic lift and toss shovel.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a top and side perspective view of an exemplary embodiment of an automatic lift and toss shovel 10. The shovel is in a gathering and pushing position where the shovel 10 can be wheeled around an area such as a driveway while gathering snow in the bucket 100. (Note: the term "snow" will be used throughout this disclosure and should be taken to include snow, dirt, sand, gravel, leaves, and/or any other materials for which the shovel can be used.) When the bucket 100 is full, snow will begin to pile up in front of the shovel 10 and will "windrow" to the sides. The shoveler can simply continue to push the shovel 10 until the perimeter of the area to be cleared is reached and can then actuate the lift and toss feature of the shovel 10. This is accomplished by giving the shovel 10 a final sharp push forward and then abruptly stopping the forward motion of the maneuvering frame 400 and frame support 300. Momentum will cause the bucket 100 and its load of snow to continue forward. The lift and toss apparatus 200 will force the bucket 100 to be lifted upwards as it moves forwards. As the bucket 100 reaches its most forward, lifted position, the lift and toss apparatus 200 causes the bucket 100 to tilt downwards and abruptly stop its forward motion. The snow that is in the bucket 100 also has forward motion, and when the bucket 100 stops moving, the snow's own momentum then causes the snow in the bucket 100 to continue forward and be tossed from the bucket 100. The bucket 100 is then automatically retracted by the lift and toss apparatus 200 to the ground position and is ready for more shoveling. If, instead, the bucket 100 pauses in the lifted position, a simple quick jerk of the shovel 10 in a rearwards direction will facilitate its retraction.

If the depth of the snow is relatively shallow, the shoveler can simply turn around and push the shovel 10 back in the opposite direction, taking a wide "bite" of the uncleared area of snow immediately to the left or right of the previously cleared path. The bucket 100 will gather and hold a large amount of snow before it is full and the snow begins to windrow to the sides of the shovel 10. If the snow is deep, the shoveler simply adjusts his or her position so that the shovel 10 is taking a smaller bite of the uncleared area so that windrowing doesn't occur.

Figure 2:
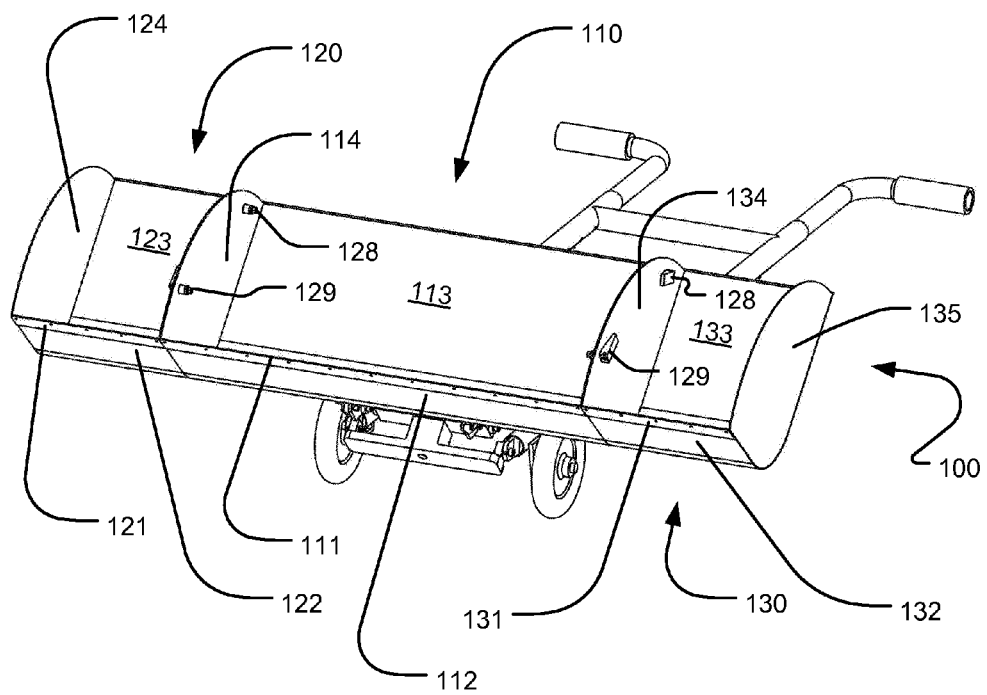
FIG. 2 illustrates a front perspective view of an exemplary embodiment of an automatic lift and toss shovel.

FIG. 2 illustrates a front perspective view of an exemplary embodiment of an automatic lift and toss shovel 10 highlighting the bucket 100 portion. In the embodiment shown in FIG. 2, the bucket 100 comprises a main bucket 110, a first bucket extension 120, and a second bucket extension 130. The main bucket 110 has a bucket lifting member 112 and a bucket gathering member 113. Attached to the underside of the bucket lifting member 112 is a bucket blade 111. The blade 111 and the front portion of the bucket lifting member 112 direct snow into the bucket 100 where it is gathered and held by the bucket gathering member 113. When the bucket 100 is lifted, the bucket lifting member 112 assists the bucket gathering member 113 in keeping the snow within the bucket 100 and lifts the snow as the bucket 100 is lifted. The bucket blade 111 also functions to reinforce the bucket 100 and assists it in breaking through hard snow and ice in order to increase the snow/ice clearing ability of the shovel 10. Additionally, the blade scrapes snow off of the surface being cleared (i.e., the working surface, such as a driveway, sidewalk, etc.), leaving a cleared, safe surface for the shoveler to walk on.

The first and second bucket extensions 120 and 130 utilize similar components to those of the main bucket 110. The first bucket extension 120 has a first extension blade 121, a first extension lifting member 122, and a first extension gathering member 123. Similarly, the second bucket extension 130 has a second extension blade 131, a second extension lifting member 132, and a second extension gathering member 133. All three buckets have first and second sidewalls to help contain the snow gathered therein. In FIG. 2, only the main bucket first sidewall 114 is visible, as the main bucket second sidewall 115 is hidden behind the second extension first sidewall 134. The second extension second sidewall 135 is visible as is the first extension first sidewall 124. However, the first extension second sidewall 125 is hidden behind the main bucket first sidewall 114. The sidewalls of the first and second extensions 120 and 130 removably attach to those of the main bucket via a plurality of upper extension connectors 128 and a plurality of lower extension connectors 129. In other embodiments, other means of removably attaching the first and second extensions 120 and 130 to the main bucket are contemplated.

The first and second bucket extensions 120 and 130 can be detached from the main bucket 110 and either stored inside the main bucket 110 or elsewhere, when not needed. For example, if the snow is particularly heavy and/or deep, it may be more efficient not to utilize the bucket extensions 120 and 130 as the main bucket 110 alone can gather and hold the amount of snow that the shoveler wishes to move.

Figure 3:
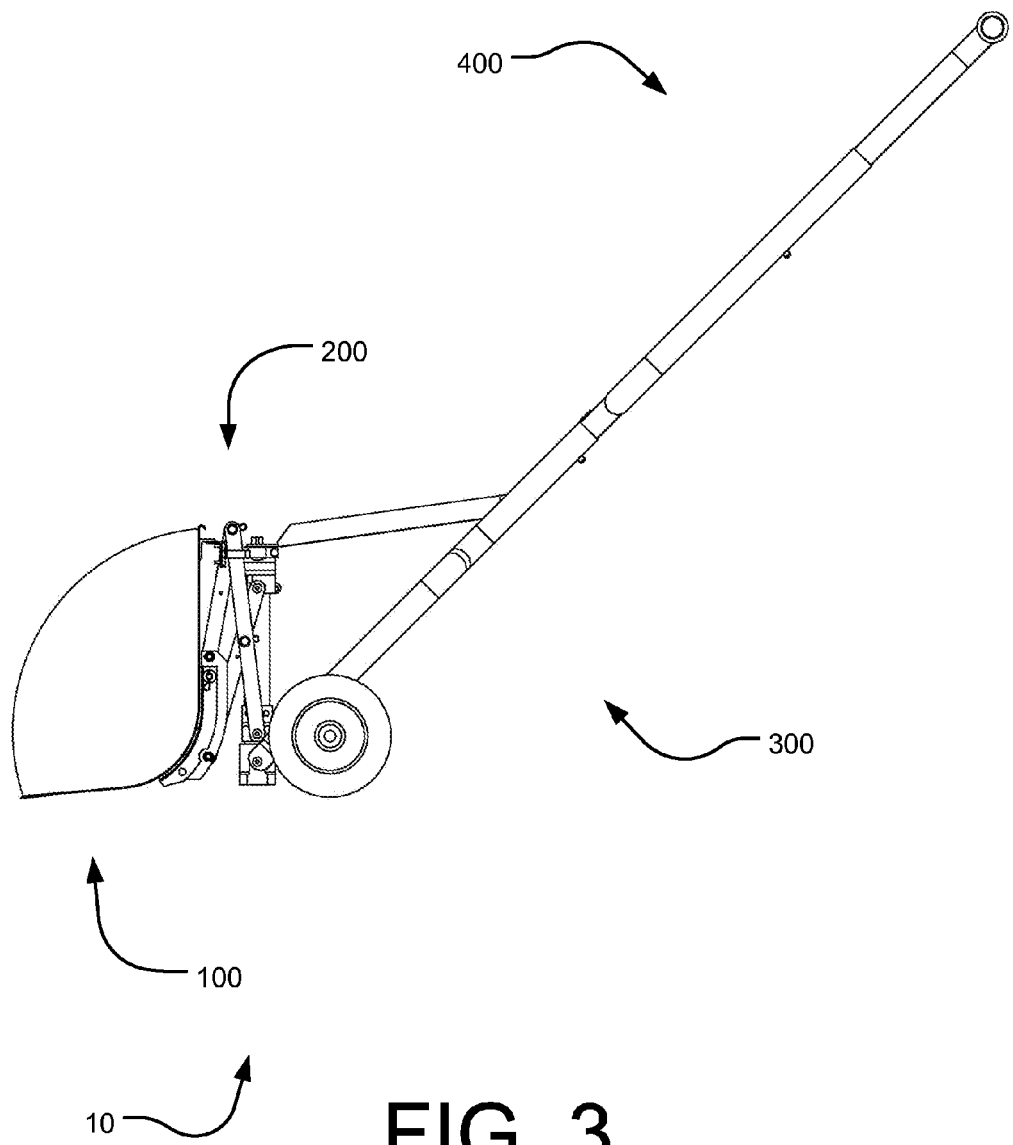
FIG. 3 illustrates a left side elevation view of an exemplary embodiment of an automatic lift and toss shovel in a gather and push position.

FIG. 3 illustrates a left side elevation view of an exemplary embodiment of an automatic lift and toss shovel 10 in a gather and push position. Here, the side view of the bucket 100 provides an understanding of its depth and hence its ability to gather and contain a large amount of snow therein. As the shovel 10 utilizes wheels and leverage to move snow, the bucket 100 can be larger than that used on a traditional shovel so that it can gather/carry more snow at a time, all while reducing the amount of effort required on the shoveler's part to move the snow. Since more snow is being moved at a time, the shoveling job is completed more quickly, and with less effort and strain on the shoveler.

Although the lift and toss apparatus 200 is illustrated in FIG. 3, later FIGs. show more detail and should be referenced for a better understanding thereof. The frame support 300 and the maneuvering frame 400 are also displayed in FIG. 3, but again, later FIGs. are illustrative of more details.

Figure 4:
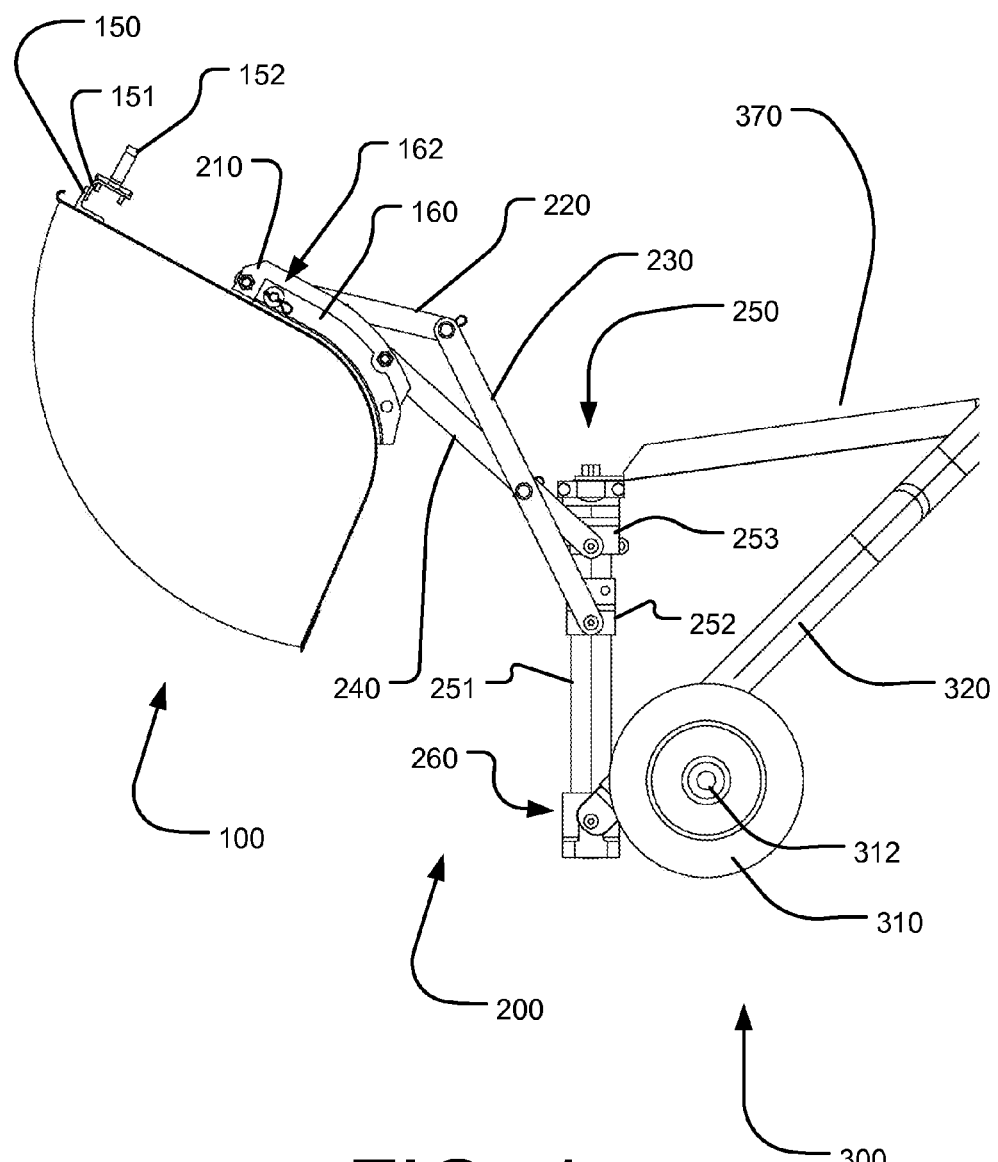
FIG. 4 illustrates a left side elevation view of an exemplary embodiment of an automatic lift and toss shovel in a lift and toss position.

FIG. 4 illustrates a left side elevation view of an exemplary embodiment of an automatic lift and toss shovel 10 in a lift and toss position. The lifted and slightly downturned position of the bucket 100 illustrates how the bucket 100 is easily discharged of the snow that was gathered therein. The components of the lift and toss apparatus 200 operate in concert to cause the bucket 100 to be lifted into this position when the shoveler abruptly stops the forward motion of the frame support 300 and maneuvering frame 400.

The lift and toss apparatus 200 is attached to the frame support 300 via two components: the tilt guide base 260 and the tilt guide brace 370. Together, those two components keep the tilt guide member 250 fixed in position relative to the frame support 300. The tilt guide member 250 includes a rigid, approximately-vertical shaft 251 upon which the tilt slide mount 252 can move up and down (for more detail, see FIG. 6). This up and down motion of the tilt slide mount 252 is important to the functionality of the lift and toss apparatus 200, as the first bucket lift member 230 is attached at a proximal end to the tilt slide mount 252 and communicates the vertical motion of the tilt slide mount 252 with the forward and upward motions of the bucket 100.

The first bucket cross member 240 is rotatably attached at a proximal end to the tilt upper mount 253 which is fixed in position at the upper end of the tilt guide member 250. Part way down the first bucket cross member 240 is rotatably affixed to the first bucket lift member 230 so that the two can scissor together and translate forces therebetween. The distal end of the first bucket lift member 230 is rotatably attached to the proximal end of the first bucket toss arm 220. The distal end of the first bucket toss arm 220 is, in turn, rotatably attached to the first bucket swing arm 210. Also attached to the first bucket swing arm 210 is the distal end of the first bucket cross member 240. The first bucket swing arm 210 is removably attached to the bucket 100. This combination of arms and members causes the forward momentum of the bucket 100 to be translated into an upwards and forwards motion to the bucket 100 relative to the frame support 300 when the latter is abruptly brought to a stop after both were previously moving forward together. When the bucket 100 reaches a limit having a certain height and distance from the tilt guide base 260, the bucket 100 is tilted downwards via the action of the first bucket lift member 230 and the first bucket toss arm 220. Immediately after the bucket 100 tilts downward, its motion is abruptly stopped. This causes any snow therein to be tossed forward and out of the bucket 100.

The first bucket swing arm 210 can be removably attached to the bucket 100. This can be accomplished via a first bucket attachment member 160 which is a part of the rear of the bucket 100. By simply detaching the first bucket swing arm 210 from the first bucket attachment member 160, the bucket 100 can be quickly and easily attached/detached for storage or shipping. Any number and/or type of removable connectors 162 can be used, such as pins, bolts, clamps, etc. In yet another embodiment, no first and second bucket swing arms 210 and 211 are utilized. Instead, the lift and toss apparatus 200 is attached directly to the first and second bucket attachment members 160 and 161 (see FIG. 10 for an illustration).

Additional components illustrated in FIG. 4 include the rear bucket support strap 150, the storage clasp bracket 151, and the storage clasp 152. The support strap 150 extends across the back of the bucket 100 and serves to stiffen the bucket 100 as well as providing a location upon which to mount the storage clasp bracket 151. The storage clasp 152 is attached to the storage clasp bracket 151 and is positioned so that it can engage a portion of the first frame support extension 320 in order to help keep the shovel 10 locked in a stored position (see FIG. 9). Although only a single storage clasp bracket 151 and storage clasp 152 are illustrated in FIG. 4, additional brackets and clasps are contemplated.

Attachment of the left side of the tilt guide base 260 to the first frame support extension 320 can be seen in FIG. 4. On the opposite side (not visible in FIG. 4), the second frame support extension 321 (see FIG. 5) is attached to the right side of the tilt guide base 260. The first wheel 310 and first axle 312 are shown in position relative to the tilt guide base 260 and first frame support extension 320. A similar second wheel 311 and second axle 313 are attached to the second frame support extension 321 (see FIG. 7). It should be apparent that the wheels 310 and 311 can engage the ground or other surface while the remaining portions of the shovel 10 are suspended thereabove. However, the leading edge of the bucket 100 and the bucket blade 111 (and those corresponding parts of the extensions 120 and 130) can be made to engage the ground by the shoveler tilting the shovel 10 slightly forwards/downwards.

In another embodiment, only a single first wheel 310 is used and no second wheel 311 is necessary. In yet another embodiment, no wheels 310 and 311 are used whatsoever; and instead, the automatic lift and toss shovel 10 glides on skis, skids, etc. or even directly on the tilt guide base 260. All of these comprise various means for carrying some or all of the weight of the shovel 10 and contents instead of distributing that weight solely between the bucket blade and the shoveler. Because of these features, a shoveler can fill the bucket with materials, tilt the bucket back on the wheels 310 and 311, the base 260, skis/skids, etc., and then relocate the bucket to a dump area and dump the materials.

Figure 5:
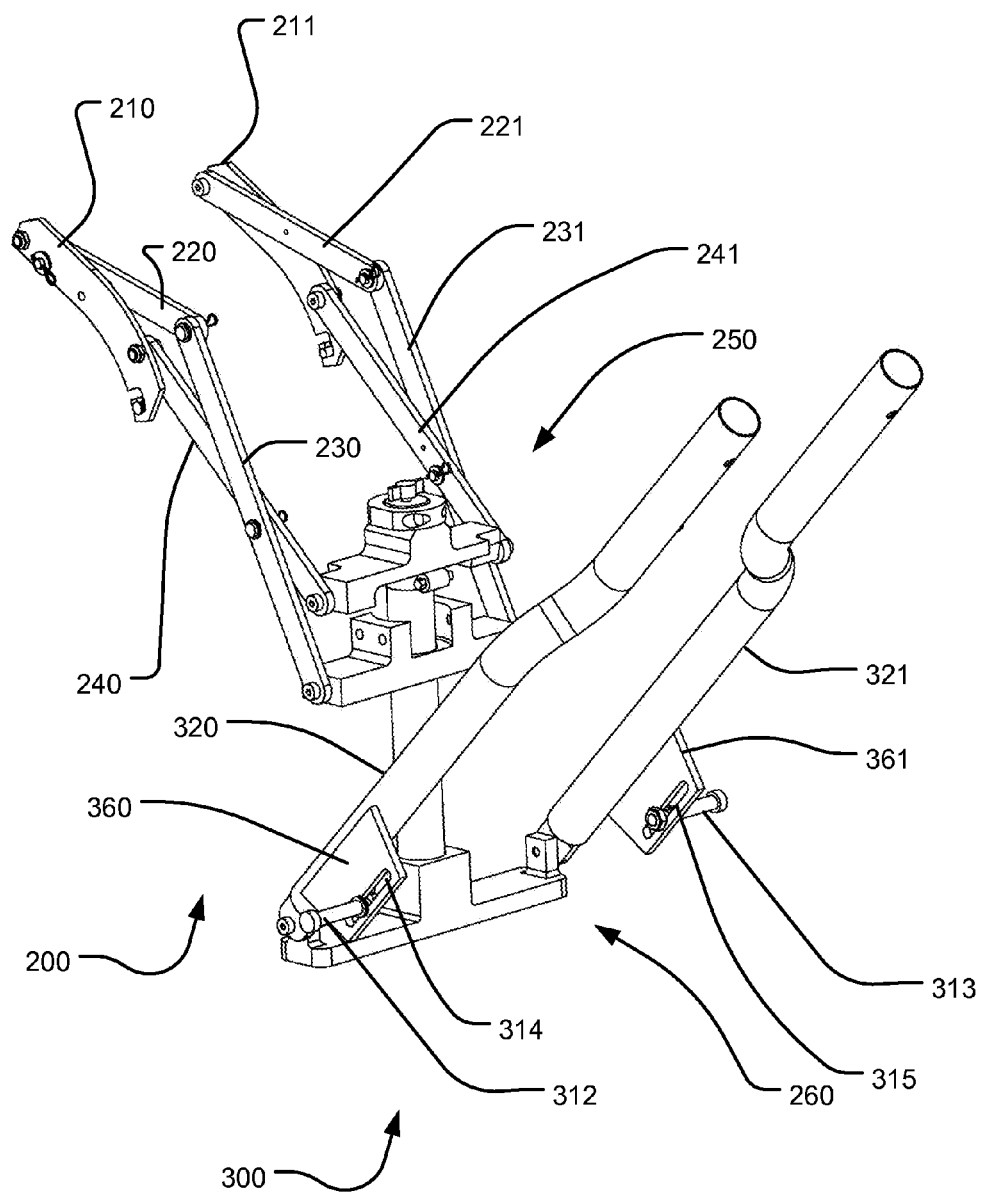
FIG. 5 illustrates a rear and left side perspective view of portions of an exemplary embodiment of a frame support and a lift and toss apparatus together in a lift and toss position.

FIG. 5 illustrates a rear and left side perspective view of portions of an exemplary embodiment of a frame support 300 and a lift and toss apparatus 200 together in a lift and toss position. In this illustration, both the left and right sides of the apparatus 200 and support 300 can be seen and it is apparent that both sides can be constructed to approximately mirror one another. Thus, for example, the first bucket cross member 240 is mirrored by the second bucket cross member 241; the first bucket lift member 230 is mirrored by the second bucket lift member 231; the first bucket toss arm 220 is mirrored by the second bucket toss arm 221, and the first bucket swing arm 210 is mirrored by the second bucket swing arm 211. In other embodiments, it is possible for the shovel 10 to utilize a single set of arms/members, or three or more sets, that ensure that the forward momentum of the bucket 100 and its contents is translated into forwards and upwards motion relative to the rest of the shovel 10 when the forward motion of the entire shovel 10 is brought to an abrupt halt. Although not shown in FIG. 5, the first bucket attachment member 160 also has a mirror component, the second bucket attachment member 161, which can be seen in FIG. 8.

In FIG. 5, the wheels 310 and 311 have been hidden so that the first and second axles 312 and 313 are more visible as are the first and second wheel adjustment slots 314 and 315 and the first and second wheel brackets 360 and 361. In other embodiments, other types of wheels, axles, wheel brackets and wheel adjustments are contemplated.

Figure 6:
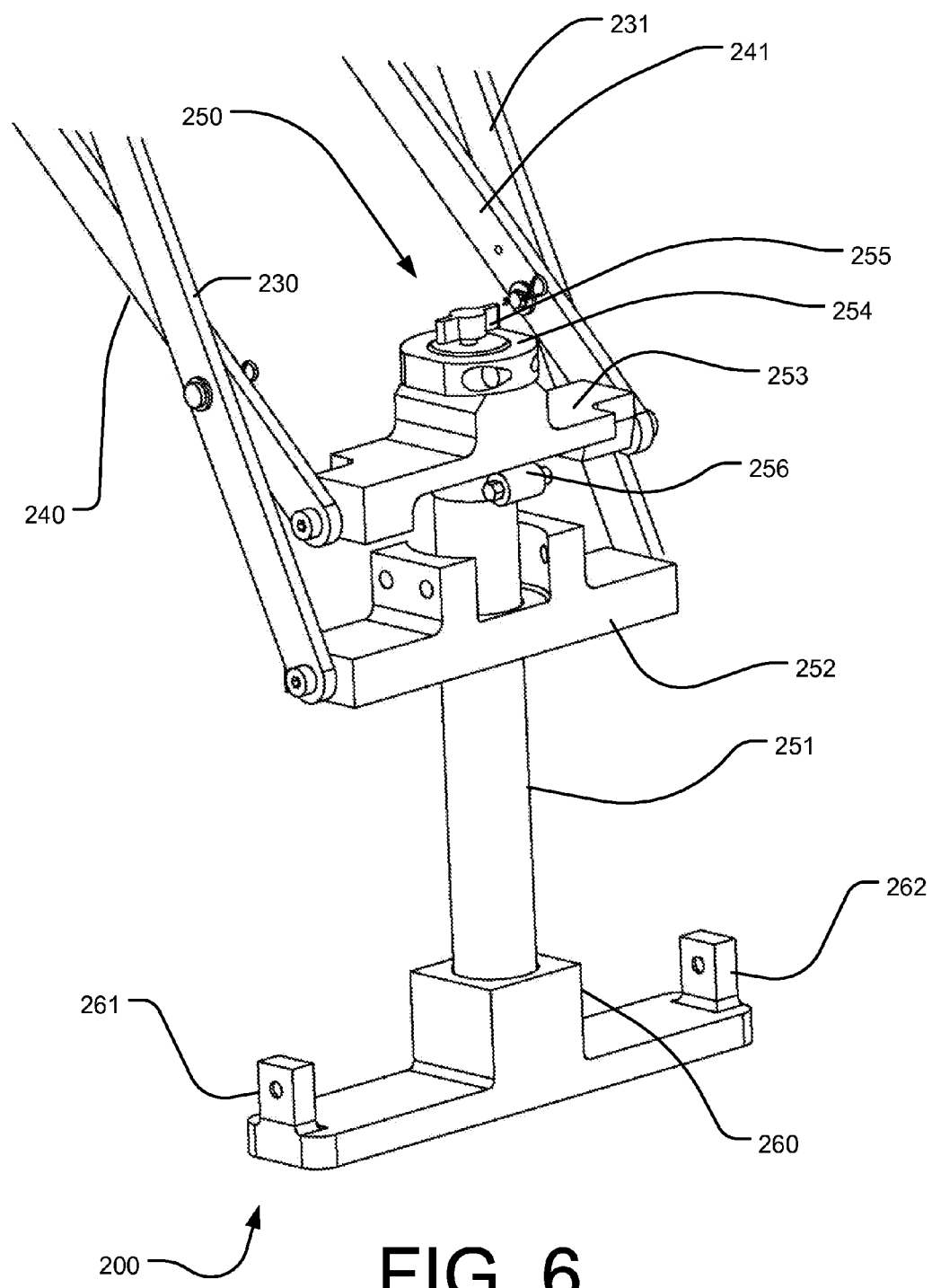
FIG. 6 illustrates a rear and left side perspective view of portions of an exemplary embodiment of a lift and toss apparatus in a lift and toss position.

FIG. 6 illustrates a rear and left side perspective view of portions of an exemplary embodiment of a lift and toss apparatus 200 in a lift and toss position. As this is a close-up view, more details of the tilt guide member 250 are illustrated. These include the generally vertically-oriented tilt guide shaft 251, the tilt slide mount 252, the tilt upper mount 253, the tilt upper stop 254, the tilt guide connector 255, and the shaft clamp 256.

The tilt guide shaft 251 extends generally upwards from the tilt guide base 260 and forms the vertical alignment guide upon which the tilt slide mount 252 moves. As the bucket 100 moves forward relative to the rest of the shovel 10, the first and second bucket lift members 230 and 231 are guided vertically by their rotatable connection to the tilt slide mount 252. This mount travels up the shaft 251 and limits the motion of the members 230 and 231. Similarly, the first and second bucket cross members 240 and 241 are rotatably attached to the tilt upper mount 253. Since the upper mount 253 is affixed to the guide shaft 251, the cross members 240 and 241 can not relocate, but they can rotate on their mountings, causing the bucket 100 to be restrained in its motion to a simple forwards and upwards trajectory. When the upwards sliding tilt slide mount 252 contacts the fixed bottom portion of the tilt upper mount 253, the upward motion of the slide mount 252 immediately ceases as does the motion of the attached bucket 100.

The tilt upper stop 254 is secured to the upper end of the shaft 251 and retains the upper mount 253 in position on the shaft. Similarly, the shaft clamp 256 is secured to the shaft 251 below the upper mount 253 and further secures it to the shaft 251. Although the embodiments shown in the FIGs. Illustrate the tilt guide member 250 as comprising a number of independent sub-components, they can be constructed together in other embodiments. For example, two or more of the shaft 251, upper mount 253, upper stop 254, and shaft clamp 256 can be one piece.

The tilt guide connector 255 can connect and secure the shaft 251 to the tilt guide base 260. In an alternate embodiment, the shaft 251 is otherwise secured to the tilt guide base 260 (for example, by threading the two and screwing them together, or by press fitting the shaft into the base, etc) and the tilt guide connector 255 serves only as the connection point for the tilt guide brace 370 to connect an upper portion of the lift and toss apparatus 200 to the frame support 300 (see FIG. 7).

Also shown in FIG. 6 are the first and second frame connectors 261 and 262. These portions of the tilt guide base 260 serve as connection points between the lift and toss apparatus 200 and the frame support 300. The first frame support extension 320 is rotatably attached to the first frame connector 261 and the second frame support extension 321 is rotatably attached to the second frame connector 262. When the tilt guide brace 370 (not shown in FIG. 6, see FIGS. 4 and 7) is disconnected from either the lift and toss apparatus 200 or the frame support 300, the frame support can be rotated towards the lift and toss apparatus 200 for storage (see FIG. 9).

Figure 7:
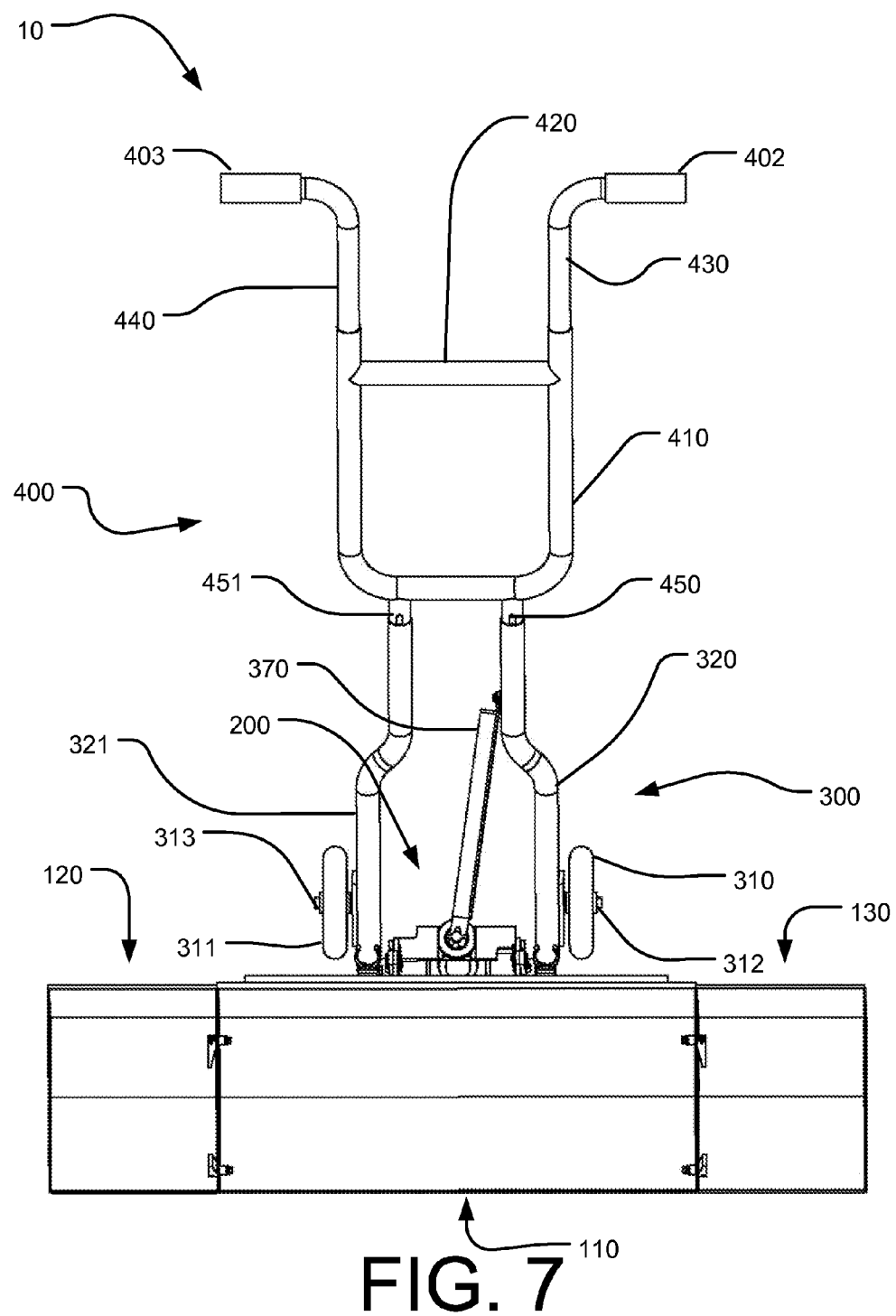
FIG. 7 illustrates a top plan view of an exemplary embodiment of an automatic lift and toss shovel.

FIG. 7 illustrates a top plan view of an exemplary embodiment of an automatic lift and toss shovel 10 highlighting the frame support 300 components and the maneuvering frame 400 components. The frame support 300 includes the first and second wheels 310 and 311, the first and second axles 312 and 313, the first and second support extensions 320 and 321, and the tilt guide brace 370. As shown in FIG. 7, the tilt guide brace 370 connects to the first support extension 320. In other embodiments, the tilt guide brace 370 can be connected to the second support extension 321, or to the maneuvering frame 400.

The maneuvering frame 400 comprises the first handle grip 402 and the second handle grip 403, the maneuvering frame member 410, the maneuvering frame cross support 420, the first extension handle 430, the second extension handle 440, and the first and second adjustment arrows 450 and 451.

The maneuvering frame member 410 resembles a large letter U in the embodiment illustrated in FIG. 7; other shapes are contemplated in other embodiments. At the base of the U, two extension arms continue down into the upper ends of the first and second support extensions 320 and 321. In one embodiment, these extension arm portions of the maneuvering frame member 410 can telescope inside (or outside) the support extensions 320 and 321 in order for the overall length of the combined frame support 300 and maneuvering frame 400 to be increased or decreased to accommodate the needs of various-sized shovelers. The first and second adjustment arrows 450 and 451 indicate the direction of adjustment. Alternatively, no adjustment is available and instead, the components are simply detachable at this juncture. In yet another embodiment, the frame support 300 is not detachable from the maneuvering frame 400; and instead, they comprise a single component.

The maneuvering frame cross support 420 helps to strengthen and stabilize the maneuvering frame member 410. Above the cross support 420, the first and second extension handles 430 and 440 can be telescoped into/over the upper portions of the U of the maneuvering frame member 410. These can be adjustable as well (for example, through the use of pop-up buttons and series of button lock holes), again helping to make the shovel customizable to fit the needs of various shovelers. Additional series of button lock holes can allow the first and second extension handles 430 and 440 to be rotated and lock in place. This adjustability provides for narrower/wider grip widths.

The first and second extension handles 430 and 440 can be combined into a single extension handle that forms a connected loop or "U" shape. Other shapes and styles of extension handles are contemplated.

The first and second extension handles 430 and 440 have an L shape in order to provide grip areas that are perpendicular to the length of the maneuvering frame 400. The first and second handle grips 402 and 403 attach to these grip areas and serve as grips for the shoveler to grasp and manipulate the shovel 10.

Figure 8:
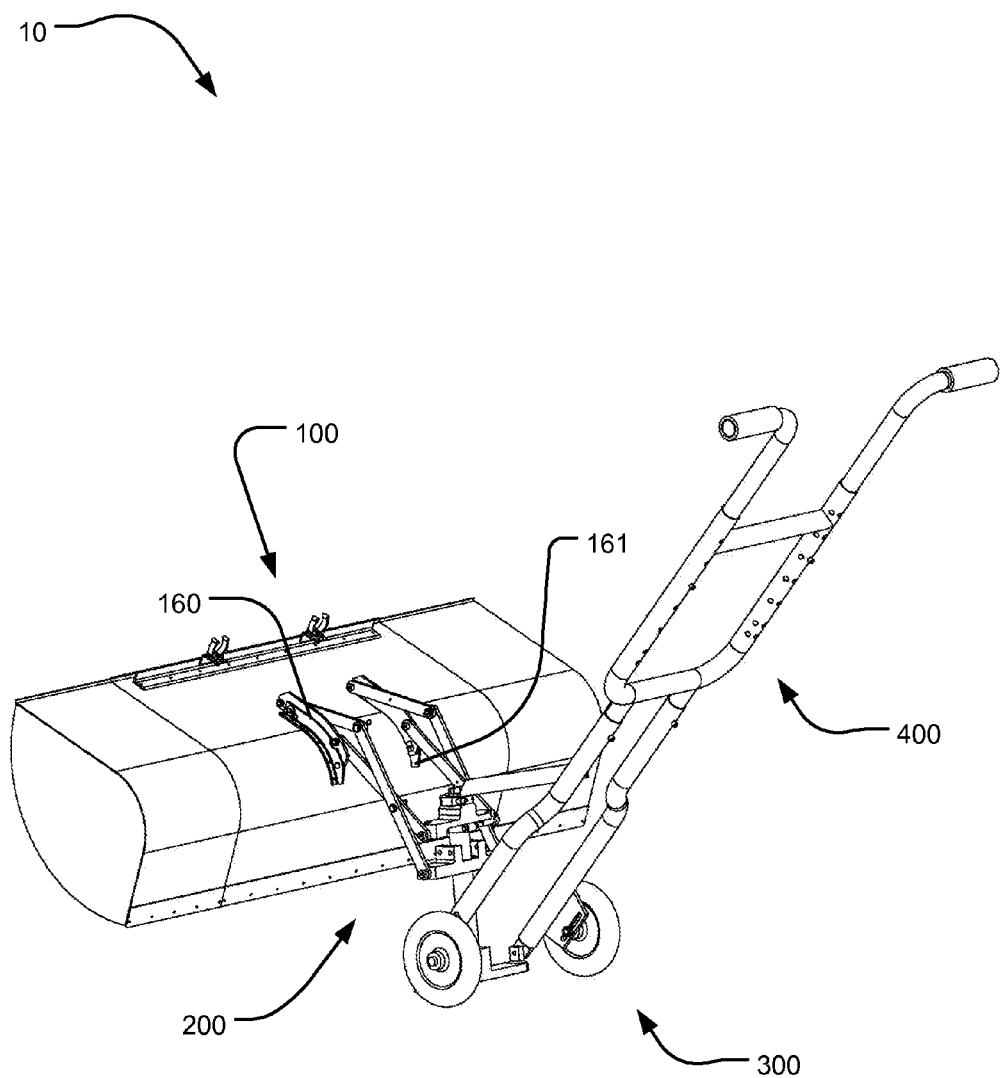
FIG. 8 illustrates a rear and left side perspective view of an exemplary embodiment of an automatic lift and toss shovel in a lift and toss position.

FIG. 8 illustrates a rear and left side perspective view of an exemplary embodiment of an automatic lift and toss shovel 10 in a lift and toss position. Now that the shovel 10 has been broken down into its components and explained in detail, one is better able to understand and appreciate a view of the shovel in action. Compare this view to those shown in FIGS. 1-3 in order to see the various positions and motion of the bucket 100 relative to the remainder of the shovel 10. Note that a series of button lock holes is visible on the far upright of the maneuvering frame member in FIG. 8; as discussed above, these allow for adjustment of the lengths of the extension handles in some embodiments.

Figure 9:
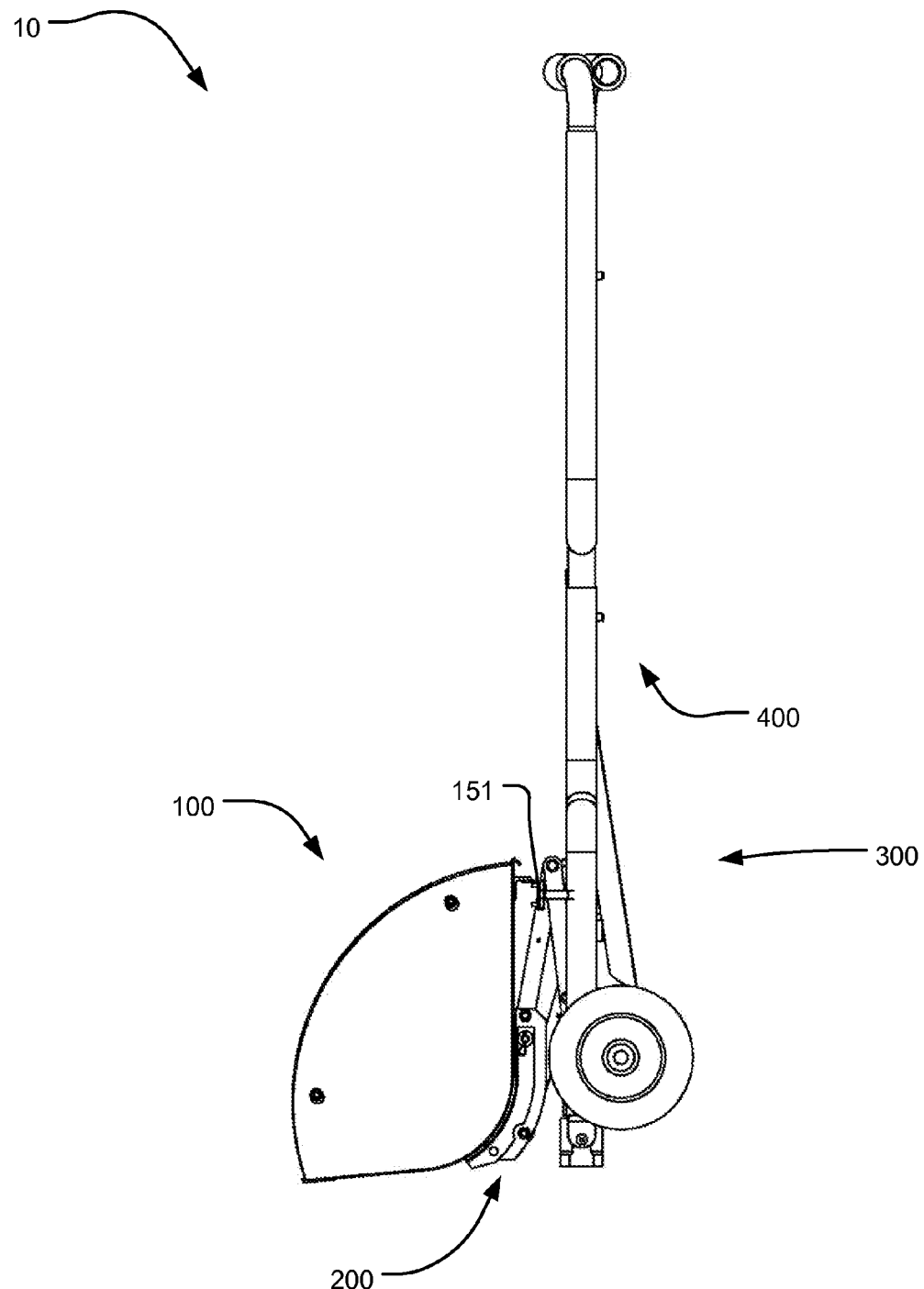
FIG. 9 illustrates a left side elevation view of an exemplary embodiment of an automatic lift and toss shovel in a stowed configuration.

FIG. 9 illustrates a left side elevation view of an exemplary embodiment of an automatic lift and toss shovel 10 in a stowed configuration. As discussed above, the tilt guide brace 370 can be disconnected from the lift and toss apparatus 200 and the frame support 300 can be folded up towards the bucket 100. The entire shovel can then rest on the tilt guide base 260 and the bucket 100, or it can be hung up to further save storage space. As shown in FIG. 9, the handles can be turned inwards so that they also take up less space. Although not illustrated in FIG. 9, the bucket 100 can be removed completely from the shovel 10 and stored separately to further reduce the footprint of the shovel 10.

Figure 10:
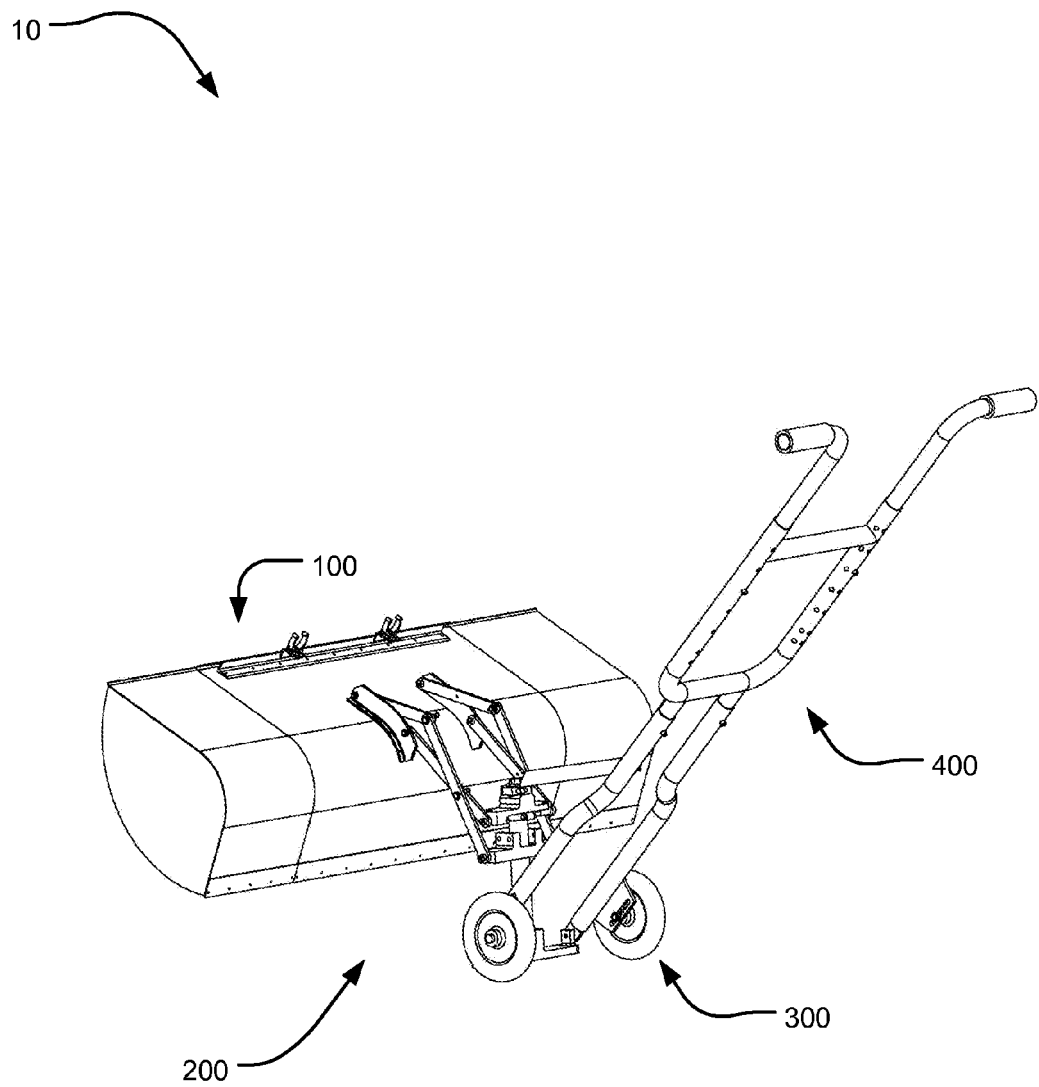
FIG. 10 illustrates a rear and left side perspective view of another exemplary embodiment of an automatic lift and toss shovel in a lift and toss position.

FIG. 10 illustrates a rear and left side perspective view of another exemplary embodiment of an automatic lift and toss shovel 10 in a lift and toss position. This embodiment illustrates that it is not necessary to utilize first and second bucket swing arms 210 and 211. In this embodiment, the lift and toss apparatus 200 is attached directly to the first and second bucket attachment members 160 and 161.

Figure 11:
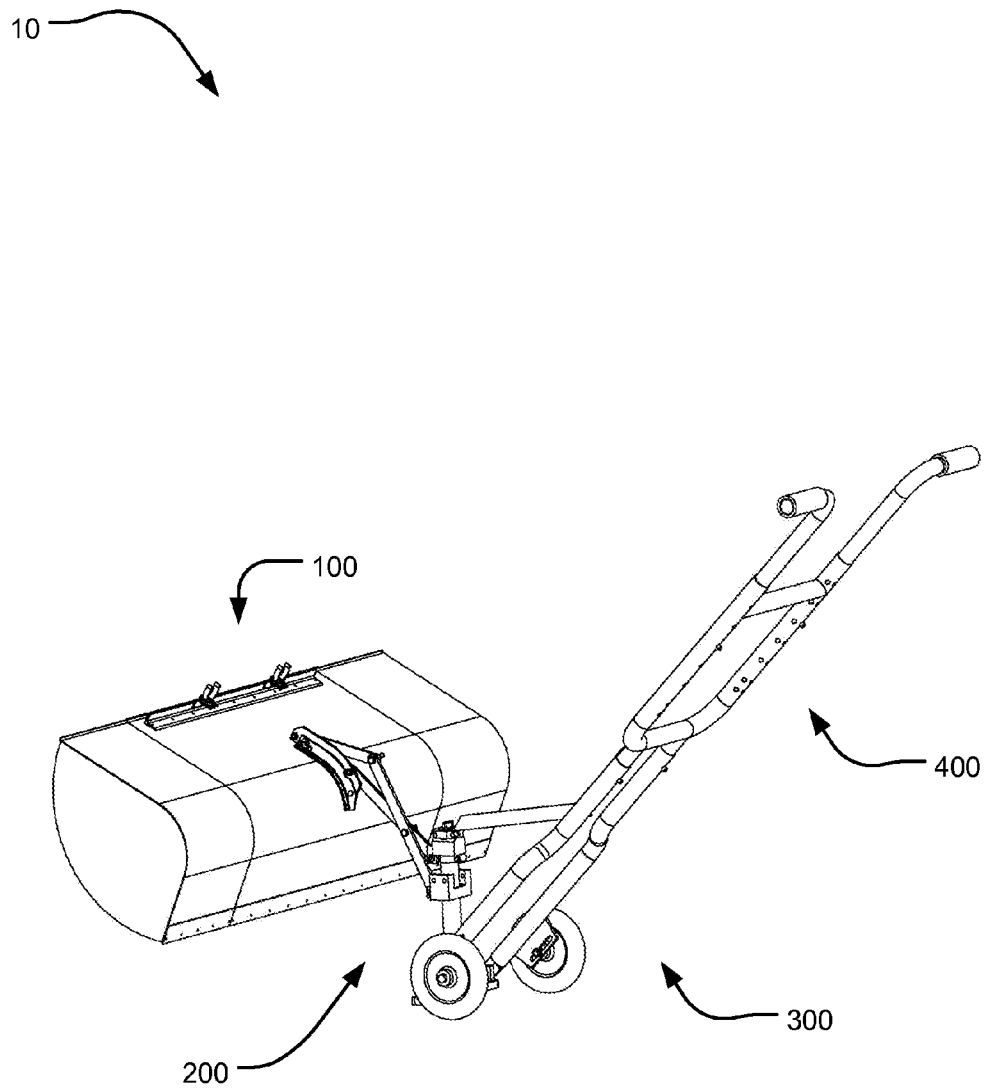
FIG. 11 illustrates a rear and left side perspective view of yet another exemplary embodiment of an automatic lift and toss shovel in a lift and toss position.

FIG. 11 illustrates a rear and left side perspective view of yet another exemplary embodiment of an automatic lift and toss shovel 10 in a lift and toss position. In this embodiment, only single components make up the lift and toss apparatus 200 instead of the mirrored components shown in other FIGs. In other embodiments, the number of mirrored components can be two, three, or more.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. An automatic lift and toss shovel, comprising:
   a bucket having a bucket lifting member and a bucket gathering member;
   wherein the bucket lifting member forms a bottom portion of the bucket and is attached to the bucket gathering member which forms a rear portion of the bucket;
   the bucket lifting member and the bucket gathering member together adapted to gather and contain materials therebetween;
   a lift and toss apparatus attached to the rear portion of the bucket and to a frame support;
   the lift and toss apparatus adapted such that when the shovel is moving forward, an abrupt termination of forward motion of the frame support causes the lift and toss apparatus to redirect continuing forward momentum of the bucket into forwards and upwards motion of the bucket;
   the lift and toss apparatus further adapted such that when the forwards and upwards motion of the bucket reaches a limit, the bucket ceases motion and materials are tossed out of the bucket;
   the frame support adapted to allow a user to tilt the shovel forward so that the bucket lifting member contacts a working surface;
   a maneuvering frame attached to the frame support and having a first extension handle and a second extension handle; and
   the first and second extension handles adapted to allow the user to maneuver the shovel.

2. The automatic lift and toss shovel of claim 1 wherein the bucket further comprises a first bucket sidewall and a second bucket sidewall, and wherein the first bucket sidewall extends from the bucket gathering member to the bucket lifting member and forms a first side portion of the bucket, and the second bucket sidewall extends from the bucket gathering member to the bucket lifting member and forms a second side portion of the bucket;
   the bucket lifting member, the first bucket sidewall, the second bucket sidewall, and the bucket gathering member together adapted to gather and contain materials therebetween; and
   wherein the bucket further comprises a bucket blade attached to the bucket lifting member and adapted to contact the working surface and assist in gathering materials into the bucket.

3. The automatic lift and toss shovel of claim 2, further comprising:
   a first bucket extension and a second bucket extension;
   the first bucket extension having a first extension lifting member, a first extension gathering member, a first extension first sidewall, and a first extension second sidewall;
   wherein the first extension lifting member forms a bottom portion of the first bucket extension and is attached to the first extension gathering member which forms a rear portion of the first bucket extension and wherein the first extension first sidewall extends from the first extension gathering member to the first extension lifting member and forms a first side portion of the first bucket extension and the first extension second sidewall extends from the first extension gathering member to the first extension lifting member and forms a second side portion of the first bucket extension;
   the first extension lifting member, the first extension gathering member, the first extension first sidewall and the first extension second sidewall together adapted to gather and contain materials therebetween;
   the second bucket extension having a second extension lifting member, a second extension gathering member, a second extension first sidewall, and a second extension second sidewall;
   wherein the second extension lifting member forms a bottom portion of the second bucket extension and is attached to the second extension gathering member which forms a rear portion of the second bucket extension and wherein the second extension first sidewall extends from the second extension gathering member to the second extension lifting member and forms a first side portion of the second bucket extension and the second extension second sidewall extends from the second extension gathering member to the second extension lifting member and forms a second side portion of the second bucket extension;
   the second extension lifting member, the second extension gathering member, the second extension first sidewall and the second extension second sidewall together adapted to gather and contain materials therebetween;
   wherein the first bucket extension removably attaches to the first bucket sidewall and the second bucket extension removably attaches to the second bucket sidewall, thereby increasing a width of the bucket; and
   wherein the first extension further comprises a first extension blade attached to the first extension lifting member and adapted to contact the working surface and assist in gathering materials into the bucket and the second extension further comprises a second extension blade attached to the second extension lifting member and adapted to contact the working surface and assist in gathering materials into the bucket.

4. The automatic lift and toss shovel of claim 1, wherein the rear portion of the bucket further comprises a first bucket attachment member extending outwards and rearwards from the bucket; and
the lift and toss apparatus is rotatably attached to the first bucket attachment member.

5. The automatic lift and toss shovel of claim 1, wherein the rear portion of the bucket further comprises a first bucket attachment member extending outwards and rearwards from the bucket;
wherein the rear portion of the bucket further comprises a first bucket swing arm, the first bucket swing arm removably attached to the first bucket attachment member and adapted for easy removal therefrom; and
wherein the lift and toss apparatus is rotatably attached to the first bucket swing arm such that when the first bucket swing arm is removed from the first bucket attachment member, the lift and toss apparatus is effectively removed from a remainder of the bucket.

6. The automatic lift and toss shovel of claim 2, wherein the rear portion of the bucket further comprises a first bucket attachment member extending outwards and rearwards from the bucket;
wherein the rear portion of the bucket further comprises a first bucket swing arm, the first bucket swing arm removably attached to the first bucket attachment member and adapted for easy removal therefrom; and
wherein the lift and toss apparatus is rotatably attached to the first bucket swing arm such that when the first bucket swing arm is removed from the first bucket attachment member, the lift and toss apparatus is effectively removed from a remainder of the bucket.

7. The automatic lift and toss shovel of claim 1, wherein the frame support further comprises a plurality of wheels adapted to contact the working surface and support the shovel above the surface.

8. The automatic lift and toss shovel of claim 2, wherein the frame support further comprises a plurality of wheels adapted to contact the working surface and support the shovel above the surface.

9. The automatic lift and toss shovel of claim 1, wherein the lift and toss apparatus is adapted to force the bucket to tilt downwards and abruptly stop all motion in order to toss any materials out of the bucket.

10. An automatic lift and toss shovel, comprising:
a bucket having a bucket lifting member and a bucket gathering member;
wherein the bucket lifting member forms a bottom portion of the bucket and is attached to the bucket gathering member which forms a rear portion of the bucket;
the bucket lifting member and the bucket gathering member together adapted to gather and contain materials therebetween;
a lift and toss apparatus comprising a tilt guide base, a tilt guide member, a tilt slide mount, a tilt upper mount, a first bucket lift member, a first bucket cross member, and a first bucket toss arm;
the tilt guide base is attached to a frame support and the tilt guide member is attached to and extends upwards from the tilt guide base;
the tilt slide mount is mounted onto the tilt guide member and is vertically slidable thereon;
the first bucket lift member having a first bucket lift member proximal end, a first bucket lift member distal end, and a first bucket lift member middle portion therebetween, and wherein the first bucket lift member proximal end is rotatably attached to the tilt slide mount;
the tilt upper mount is attached to an upper portion of the tilt guide member above the tilt slide mount;
the first bucket cross member having a first bucket cross member proximal end, a first bucket cross member distal end, and a first bucket cross member middle portion therebetween, and wherein the first bucket cross member proximal end is rotatably attached to the tilt upper mount;
the first bucket cross member middle portion is rotatably attached to the first bucket lift member middle portion;
the first bucket cross member distal end is rotatably attached to the bucket;
the first bucket toss arm having a first bucket toss arm proximal end and a first bucket toss arm distal end;
the first bucket lift member distal end is rotatably attached to the first bucket toss arm proximal end and the first bucket toss arm distal end is rotatably attached to the bucket;
the lift and toss apparatus adapted such that when the shovel is moving forward, an abrupt termination of forward motion of the frame support causes the lift and toss apparatus to redirect continuing forward momentum of the bucket into forwards and upwards motion of the bucket;
the frame support adapted to allow a user to tilt the shovel forward so that the bucket lifting member contacts a working surface;
a maneuvering frame attached to the frame support and having a first extension handle and a second extension handle; and
the first and second extension handles adapted to allow the user to maneuver the shovel.

11. The automatic lift and toss shovel of claim 10 wherein the bucket further comprises a first bucket sidewall and a second bucket sidewall, and wherein the first bucket sidewall extends from the bucket gathering member to the bucket lifting member and forms a first side portion of the bucket, and the second bucket sidewall extends from the bucket gathering member to the bucket lifting member and forms a second side portion of the bucket;
the bucket lifting member, the first bucket sidewall, the second bucket sidewall, and the bucket gathering member together adapted to gather and contain materials therebetween; and
wherein the bucket further comprises a bucket blade attached to the bucket lifting member and adapted to contact the working surface and assist in gathering materials into the bucket.

12. The automatic lift and toss shovel of claim 11, further comprising:
a first bucket extension and a second bucket extension;
the first bucket extension having a first extension lifting member, a first extension gathering member, a first extension first sidewall, and a first extension second sidewall;
wherein the first extension lifting member forms a bottom portion of the first bucket extension and is attached to the first extension gathering member which forms a rear portion of the first bucket extension and wherein the first extension first sidewall extends from the first extension gathering member to the first extension lifting member and forms a first side portion of the first bucket extension and the first extension second sidewall extends from the first extension gathering member to the first extension lifting member and forms a second side portion of the first bucket extension;

the first extension lifting member, the first extension gathering member, the first extension first sidewall and the first extension second sidewall together adapted to gather and contain materials therebetween;

the second bucket extension having a second extension lifting member, a second extension gathering member, a second extension first sidewall, and a second extension second sidewall;

wherein the second extension lifting member forms a bottom portion of the second bucket extension and is attached to the second extension gathering member which forms a rear portion of the second bucket extension and wherein the second extension first sidewall extends from the second extension gathering member to the second extension lifting member and forms a first side portion of the second bucket extension and the second extension second sidewall extends from the second extension gathering member to the second extension lifting member and forms a second side portion of the second bucket extension;

the second extension lifting member, the second extension gathering member, the second extension first sidewall and the second extension second sidewall together adapted to gather and contain materials therebetween; and wherein the first bucket extension removably attaches to the first bucket sidewall and the second bucket extension removably attaches to the second bucket sidewall, thereby increasing a width of the bucket; and wherein the first extension further comprises a first extension blade attached to the first extension lifting member and adapted to contact the working surface and assist in gathering materials into the bucket and the second extension further comprises a second extension blade attached to the second extension lifting member and adapted to contact the working surface and assist in gathering materials into the bucket.

13. The automatic lift and toss shovel of claim 10, wherein the rear portion of the bucket further comprises a first bucket attachment member extending outwards and rearwards from the bucket;

and wherein the first bucket toss arm distal end is rotatably attached to the first bucket attachment member and the first bucket cross member distal end is rotatably attached to the first bucket attachment member.

14. The automatic lift and toss shovel of claim 10, wherein the rear portion of the bucket further comprises a first bucket attachment member and a first bucket swing arm;

the first bucket attachment member extending outwards and rearwards from the bucket;

the first bucket swing arm removably attached to the first bucket attachment member;

wherein the first bucket toss arm distal end is rotatably attached to the first bucket swing arm and the first bucket cross member distal end is rotatably attached to the first bucket swing arm; and whereby removal of the first bucket swing arm from the first bucket attachment member effectively detaches the lift and toss apparatus from a remainder of the bucket.

15. The automatic lift and toss shovel of claim 11, wherein the rear portion of the bucket further comprises a first bucket attachment member and a first bucket swing arm;

the first bucket attachment member extending outwards and rearwards from the bucket;

the first bucket swing arm removably attached to the first bucket attachment member;

wherein the first bucket toss arm distal end is rotatably attached to the first bucket swing arm and the first bucket cross member distal end is rotatably attached to the first bucket swing arm; and whereby removal of the first bucket swing arm from the first bucket attachment member effectively detaches the lift and toss apparatus from a remainder of the bucket.

16. The automatic lift and toss shovel of claim 10, wherein the frame support further comprises a plurality of wheels adapted to contact the working surface and support the shovel above the surface.

17. The automatic lift and toss shovel of claim 10, wherein the lift and toss apparatus is further adapted such that when the forwards and upwards motion of the bucket reaches a limit, the lift and toss apparatus forces the bucket to tilt downwards and abruptly stop all motion in order to toss any materials out of the bucket.

18. An automatic lift and toss shovel, comprising:

a bucket having a bucket lifting member and a bucket gathering member;

wherein the bucket lifting member forms a bottom portion of the bucket and is attached to the bucket gathering member which forms a rear portion of the bucket;

the bucket lifting member and the bucket gathering member together adapted to gather and contain materials therebetween;

a lift and toss apparatus comprising a tilt guide base, a tilt guide shaft, a tilt slide mount, a tilt upper mount, a first bucket lift member, a second bucket lift member, a first bucket cross member, a second bucket cross member, a first bucket toss arm, and a second bucket toss arm;

the tilt guide base is attached to a frame support and the tilt guide shaft is attached to and extends upwards from the tilt guide base;

the tilt slide mount is mounted onto the tilt guide shaft and is vertically slidable thereon;

the first bucket lift member having a first bucket lift member proximal end, a first bucket lift member distal end, and a first bucket lift member middle portion therebetween, and wherein the first bucket lift member proximal end is rotatably attached to the tilt slide mount;

the second bucket lift member having a second bucket lift member proximal end, a second bucket lift member distal end, and a second bucket lift member middle portion therebetween, and wherein the second bucket lift member proximal end is rotatably attached to the tilt slide mount;

the tilt upper mount is attached to an upper portion of the tilt guide shaft above the tilt slide mount;

the first bucket cross member having a first bucket cross member proximal end, a first bucket cross member distal end, and a first bucket cross member middle portion therebetween, and wherein the first bucket cross member proximal end is rotatably attached to the tilt upper mount;

the second bucket cross member having a second bucket cross member proximal end, a second bucket cross member distal end, and a second bucket cross member middle portion therebetween, and wherein the second bucket cross member proximal end is rotatably attached to the tilt upper mount;

the first bucket cross member middle portion is rotatably attached to the first bucket lift member middle portion;

the second bucket cross member middle portion is rotatably attached to the second bucket lift member middle portion;
the first bucket cross member distal end is rotatably attached to the bucket;
the second bucket cross member distal end is rotatably attached to the bucket;
the first bucket toss arm having a first bucket toss arm proximal end and a first bucket toss arm distal end;
the second bucket toss arm having a second bucket toss arm proximal end and a second bucket toss arm distal end;
the first bucket lift member distal end is rotatably attached to the first bucket toss arm proximal end and the first bucket toss arm distal end is rotatably attached to the bucket;
the second bucket lift member distal end is rotatably attached to the second bucket toss arm proximal end and the second bucket toss arm distal end is rotatably attached to the bucket;
the lift and toss apparatus adapted such that when the shovel is moving forward, an abrupt termination of forward motion of the frame support causes the lift and toss apparatus to redirect continuing forward momentum of the bucket into forwards and upwards motion of the bucket;
the frame support adapted to allow a user to tilt the shovel forward so that the bucket lifting member contacts a working surface;
a maneuvering frame attached to the frame support and having a first extension handle and a second extension handle; and
the first and second extension handles adapted to allow the user to maneuver the shovel.

19. The automatic lift and toss shovel of claim 18 wherein the bucket further comprises a first bucket sidewall and a second bucket sidewall, and wherein the first bucket sidewall extends from the bucket gathering member to the bucket lifting member and forms a first side portion of the bucket, and the second bucket sidewall extends from the bucket gathering member to the bucket lifting member and forms a second side portion of the bucket;
the bucket lifting member, the first bucket sidewall, the second bucket sidewall, and the bucket gathering member together adapted to gather and contain materials therebetween; and
wherein the bucket further comprises a bucket blade attached to the bucket lifting member and adapted to contact the working surface and assist in gathering materials into the bucket.

20. The automatic lift and toss shovel of claim 19, further comprising:
a first bucket extension and a second bucket extension;
the first bucket extension having a first extension lifting member, a first extension gathering member, a first extension first sidewall, and a first extension second sidewall;
wherein the first extension lifting member forms a bottom portion of the first bucket extension and is attached to the first extension gathering member which forms a rear portion of the first bucket extension and wherein the first extension first sidewall extends from the first extension gathering member to the first extension lifting member and forms a first side portion of the first bucket extension and the first extension second sidewall extends from the first extension gathering member to the first extension lifting member and forms a second side portion of the first bucket extension;
the first extension lifting member, the first extension gathering member, the first extension first sidewall and the first extension second sidewall together adapted to gather and contain materials therebetween;
the second bucket extension having a second extension lifting member, a second extension gathering member, a second extension first sidewall, and a second extension second sidewall;
wherein the second extension lifting member forms a bottom portion of the second bucket extension and is attached to the second extension gathering member which forms a rear portion of the second bucket extension and wherein the second extension first sidewall extends from the second extension gathering member to the second extension lifting member and forms a first side portion of the second bucket extension and the second extension second sidewall extends from the second extension gathering member to the second extension lifting member and forms a second side portion of the second bucket extension;
the second extension lifting member, the second extension gathering member, the second extension first sidewall and the second extension second sidewall together adapted to gather and contain materials therebetween;
wherein the first bucket extension removably attaches to the first bucket sidewall and the second bucket extension removably attaches to the second bucket sidewall, thereby increasing a width of the bucket, and
wherein the first extension further comprises a first extension blade attached to the first extension lifting member and adapted to contact the working surface and assist in gathering materials into the bucket and the second extension further comprises a second extension blade attached to the second extension lifting member and adapted to contact the working surface and assist in gathering materials into the bucket.

21. The automatic lift and toss shovel of claim 19, wherein the rear portion of the bucket further comprises a first bucket attachment member, a second bucket attachment member, a first bucket swing arm, and a second bucket swing arm;
the first bucket attachment member extending outwards and rearwards from the bucket;
the second bucket attachment member extending outwards and rearwards from the bucket;
the first bucket swing arm removably attached to the first bucket attachment member;
the second bucket swing arm removably attached to the second bucket attachment member;
wherein the first bucket toss arm distal end is rotatably attached to the first bucket swing arm and the first bucket cross member distal end is rotatably attached to the first bucket swing arm;
wherein the second bucket toss arm distal end is rotatably attached to the second bucket swing arm and the second bucket cross member distal end is rotatably attached to the second bucket swing arm; and
whereby removal of the first bucket swing arm from the first bucket attachment member and removal of the second bucket swing arm from the second bucket attachment member effectively detaches the lift and toss apparatus from a remainder of the bucket.

22. The automatic lift and toss shovel of claim 20, wherein the rear portion of the bucket further comprises a first bucket attachment member, a second bucket attachment member, a first bucket swing arm, and a second bucket swing arm;
the first bucket attachment member extending outwards and rearwards from the bucket;

the second bucket attachment member extending outwards and rearwards from the bucket;

the first bucket swing arm removably attached to the first bucket attachment member;

the second bucket swing arm removably attached to the second bucket attachment member;

wherein the first bucket toss arm distal end is rotatably attached to the first bucket swing arm and the first bucket cross member distal end is rotatably attached to the first bucket swing arm;

wherein the second bucket toss arm distal end is rotatably attached to the second bucket swing arm and the second bucket cross member distal end is rotatably attached to the second bucket swing arm; and whereby removal of the first bucket swing arm from the first bucket attachment member and removal of the second bucket swing arm from the second bucket attachment member effectively detaches the lift and toss apparatus from a remainder of the bucket.

23. The automatic lift and toss shovel of claim 18, wherein the frame support further comprises a plurality of wheels adapted to contact the working surface and support the shovel above the surface.

24. The automatic lift and toss shovel of claim 19, wherein the frame support further comprises a plurality of wheels adapted to contact the working surface and support the shovel above the surface.

25. The automatic lift and toss shovel of claim 18, wherein the lift and toss apparatus is further adapted such that when the forwards and upwards motion of the bucket reaches a limit, the lift and toss apparatus forces the bucket to tilt downwards and abruptly stop all motion in order to toss any materials out of the bucket.

* * * * *